Sept. 9, 1969  R. E. SARGENT  3,466,034
GAME DEVICE
Filed June 9, 1967
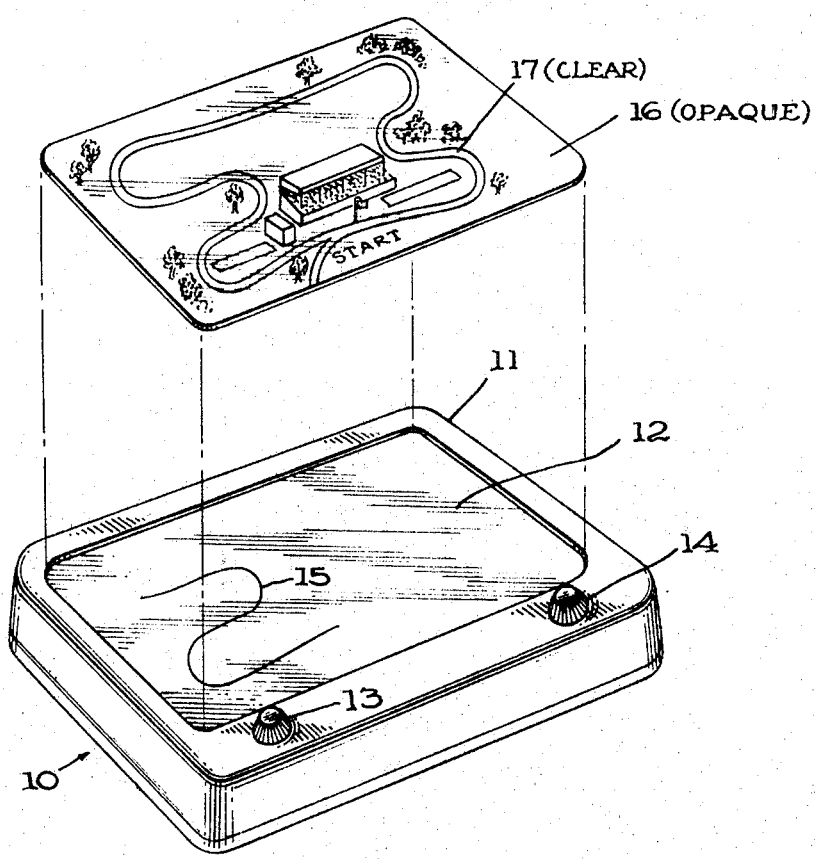
INVENTOR
Raymond W. Sargent
BY Edwin E. Greigg
ATTORNEY

United States Patent Office 3,466,034
Patented Sept. 9, 1969

3,466,034
GAME DEVICE
Raymond E. Sargent, R.D. 1, Burlington, Vt. 05401
Filed June 9, 1967, Ser. No. 644,911
Int. Cl. A63f *9/00;* B43l *13/14*
U.S. Cl. 273—1                    3 Claims

ABSTRACT OF THE DISCLOSURE

The invention relates to an overlay element arranged to be positioned over the translucent surface of a game device provided with a tracing stylus and covered by U.S. Patent No. 3,055,113. The overlay includes transparent or framed curvilinear lines of demarcation depicting a closed race course. Upon playing the patented game device one attempts to control the tracing stylus thereof in such a manner that it will be traversed through the entire curvilinear path of the race course without departing therefrom.

BACKGROUND OF THE INVENTION

This invention relates to an improvement for attachment to an educational game of the type known in the trade as "Etch-O-Graph" and patented by Arthur Grandjean, No. 3,055,113, granted Sept. 13, 1962.

The patented device comprises a fluid-tight case provided in its upper part with a translucent surface of glass or other similar material which is made opaque when the case is turned upside down. The fluid-tight case is partly filled with a pulverulent material which is adapted to adhere to the translucent surface and includes a movable tracing stylus adapted to frictionally engage the inner surface of the translucent surface thereby removing from the opaque surface during its passage along the lower surface of the plate of glass the pulverulent material which adheres thereto thereby forming lines which are visible from the outside of the case. The markings or other lines which are traced on the lower surface of the sheet of glass can be merely erased or wiped away by turning the case upside down and shaking it so as to re-spread the pulverulent material over the surface of the glass once again.

The present invention relates primarily to a device for use with the educational game device described above and includes in its preferred embodiment an overlay consisting of a planar sheet of material which has a perimetrical area complemental to the exposed surface of glass of the tracing device and framed by the upstanding wall of the fluid-tight casing.

SUMMARY OF THE INVENTION

An object of the invention is to construct the overlay of any suitable material, such as translucent plastic or frosted glass, the only requirement being that there be provided on the exposed surface of the overlay element or sheet a transparent curvilinear line of demarcation depicting, by way of example, an automobile or other race course so that the operator of the educational game device who uses the overlay will be able to view the tracing stylus through the curvilinear transparent area and endeavor to traverse the stylus thereabout in the shortest time possible without having the stylus depart from the race course, thus disqualifying the operator from competition.

There is considerable interest today with adults, both male and female, as well as children of all age groups, in automotive racing and large sums of money are invested in all types of racing cars as well as various race courses around the globe where such racing events are held.

There are many race courses which have tortuous paths or closed courses, such as Le Mans, Riverside, etc., all of which are well-known to present day car racing enthusiasts Since it is quite expensive to be able to be in attendance at all of the various racing courses throughout the various parts of the world, it was the inventor's belief that many racing enthusiasts, whether adult or child, could receive many enjoyable hours of imaginative play with his improvement which is adapted particularly for use with the patented device known as "Etch-O-Graph."

Other objects and advantages will become apparent from the following description taken in conjunction with the accompanying drawings.

BRIEF DESCRIPTION OF THE DRAWING

The figure shows in exploded perspective a conventional "Etch-O-Graph" and an overlay for use therewith.

DESCRIPTION OF THE PREFERRED EMBODIMENT

The use of the "Etch-O-Graph" will be readily understood by referring to Patent No. 3,055,113, but in its basic concept involves a fluid-tight casing 10 provided with an upstanding marginal wall area terminating in the generally flat wall, a portion of which forms a frame 11 for a glass plate 12. The knobs 13 and 14 are used to traverse the tracing stylus beneath the glass plate to remove the pulverulent material therefrom, thereby leaving viewable markings on the plate such as represented by the partial curved line 15 shown in FIG. 1, all of which will be better understood by further reference to Patent No. 3,055,113.

The overlay 16 shown in FIG. 2 may be constructed of any suitable material as indicated hereinbefore, it only being necessary that the tortuous race course represented by the curvilinear line 17 shown thereon be transparent so that one using the "Etch-O-Graph" will be able to view the stylus when it traces through the pulverulent material and leaves a line on the inner surface of the glass plate.

The surface of the overlay 16, other than for the transparent area referred to, may include any esthetic or appealing design, such as trees or other wooded areas, shrubs, representations of racing cars, people, racing pits necessary to car repairs, etc.

What is claimed is:
1. In combination, a game device comprising a fluid-tight case having a translucent surface and including a frame portion and further including therewithin a pulverulent material for dusting the surface thereof and a tracing stylus for movement within said casing to trace a line on the translucent surface by removing the pulverulent material therefrom, and an overlay element of a generally translucent substance having a perimeter complemental to the translucent surface of said game device to thereby lie snugly within the frame portion thereof, said translucent substance including at least one transparent curvilinear line of demarcation depicting a closed race course whereby the operator of the tracing stylus en- deavors to remove only the pulverulent material from the translucent surface of the game device and from within the bounds of said race course depicted by the curvilinear line.

2. An improved device for attachment to a translucent surface of a game device as claimed in claim 1, wherein the translucent substance consists of a plastic sheet.

3. An improved device for attachment to a translucent surface of a game device as claimed in claim 1, wherein the translucent substance consists of a sheet of frosted glass.

References Cited

UNITED STATES PATENTS 2,808,263 10/1957 Goldfinger et al.
3,114,547 12/1963 Joslyn _____ 35—66 XR ANTON O. OECHSLE, Primary Examiner
PAUL E. SHAPIRO, Assistant Examiner U.S. Cl. X.R.
33—18; 35—66